March 4, 1952   A. H. HORSWELL ET AL   2,587,727
TILTABLE INDUCTION FURNACE
Filed Sept. 3, 1949   6 Sheets-Sheet 1
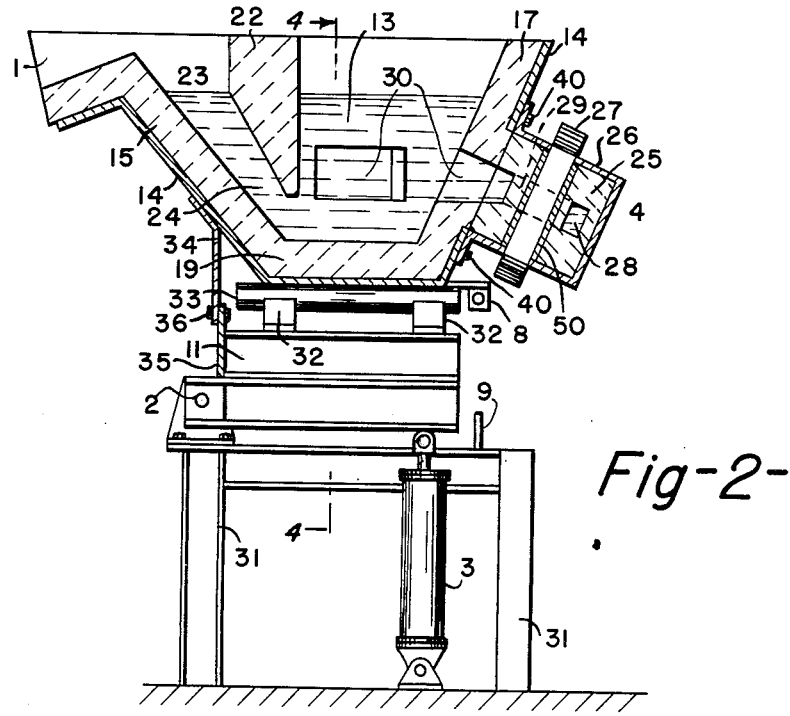
Fig-2-
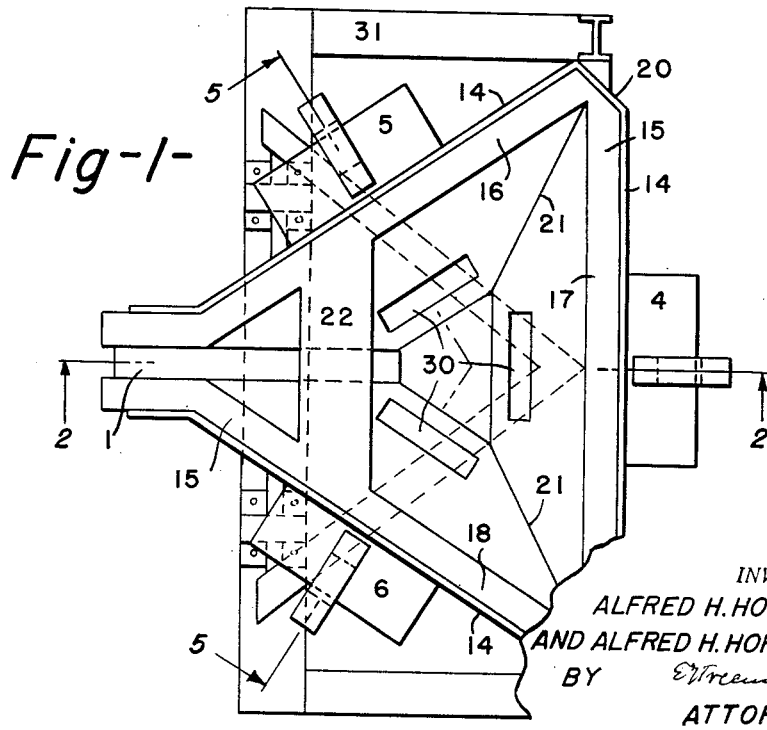
Fig-1-
INVENTORS.
ALFRED H. HORSWELL
AND ALFRED H. HORSWELL, JR.
BY
ATTORNEY

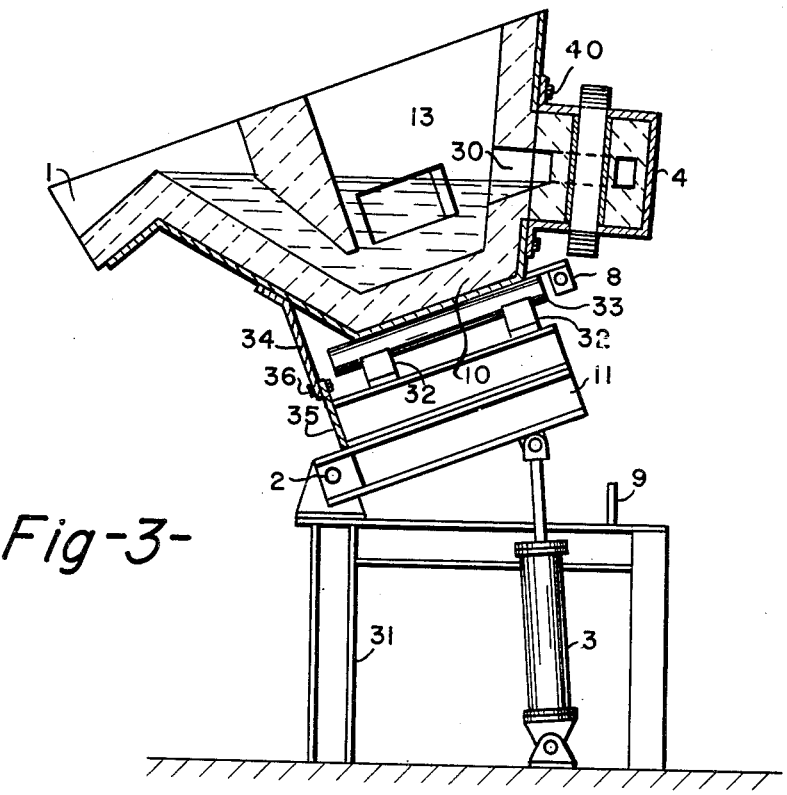
Fig-3-
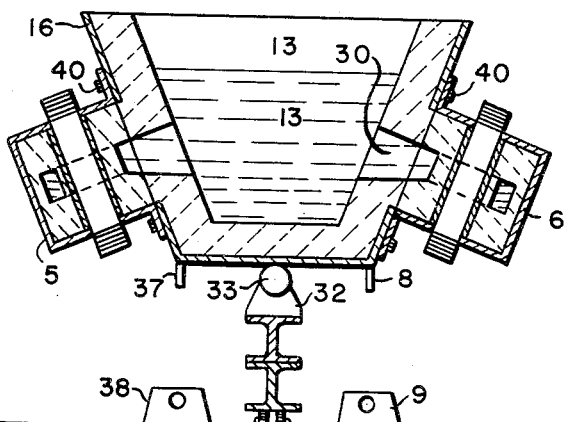
Fig-4-
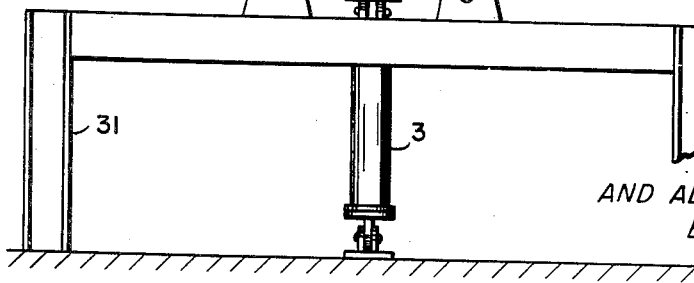

March 4, 1952 A. H. HORSWELL ET AL 2,587,727
TILTABLE INDUCTION FURNACE
Filed Sept. 3, 1949 6 Sheets-Sheet 3
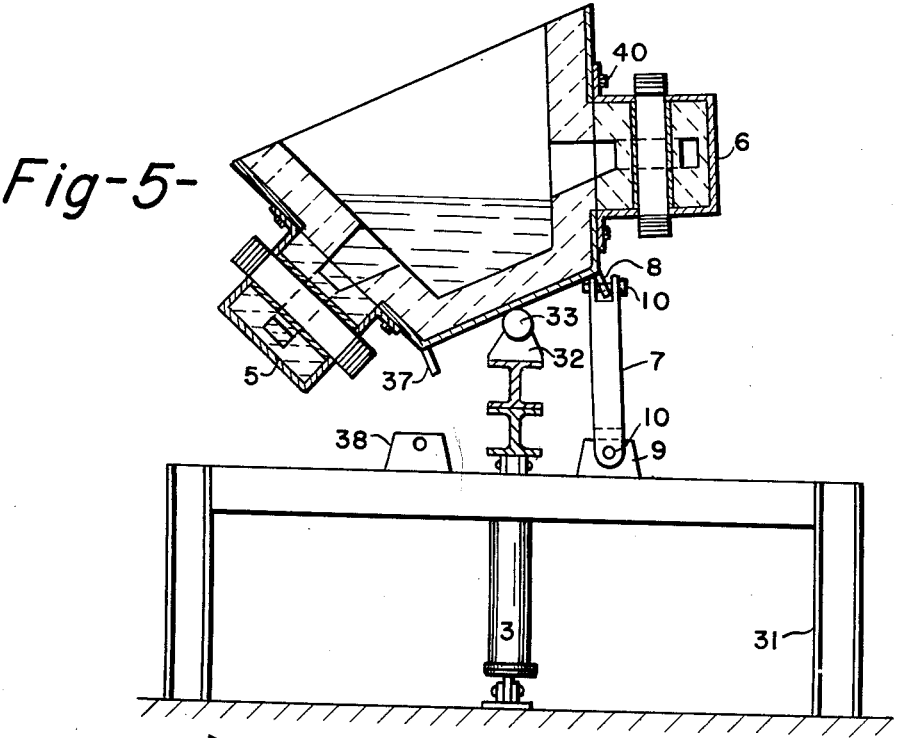
Fig-5-
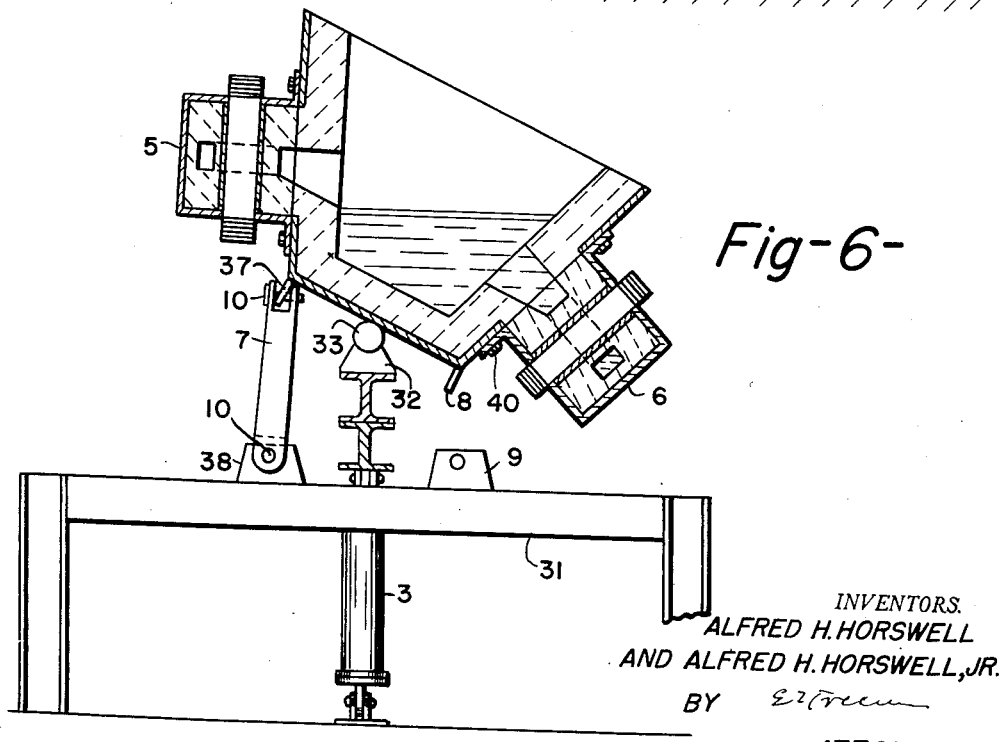
Fig-6-
INVENTORS.
ALFRED H. HORSWELL
AND ALFRED H. HORSWELL, JR.
BY
ATTORNEY

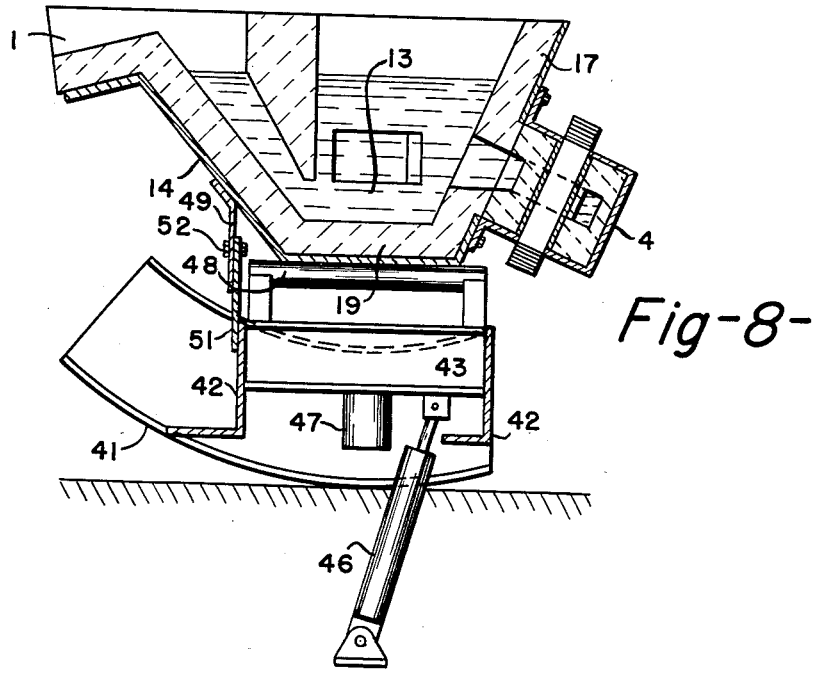
Fig-8-
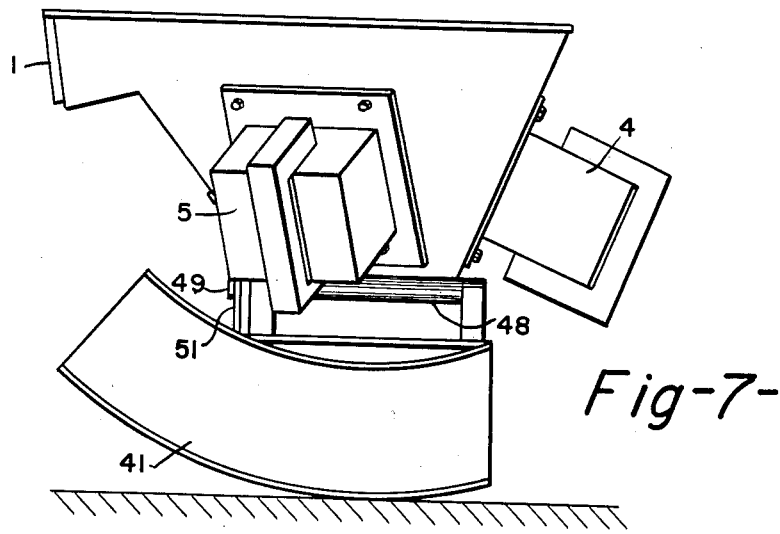
Fig-7-
INVENTORS.
ALFRED H. HORSWELL
AND ALFRED H. HORSWELL, JR.
BY
ATTORNEY

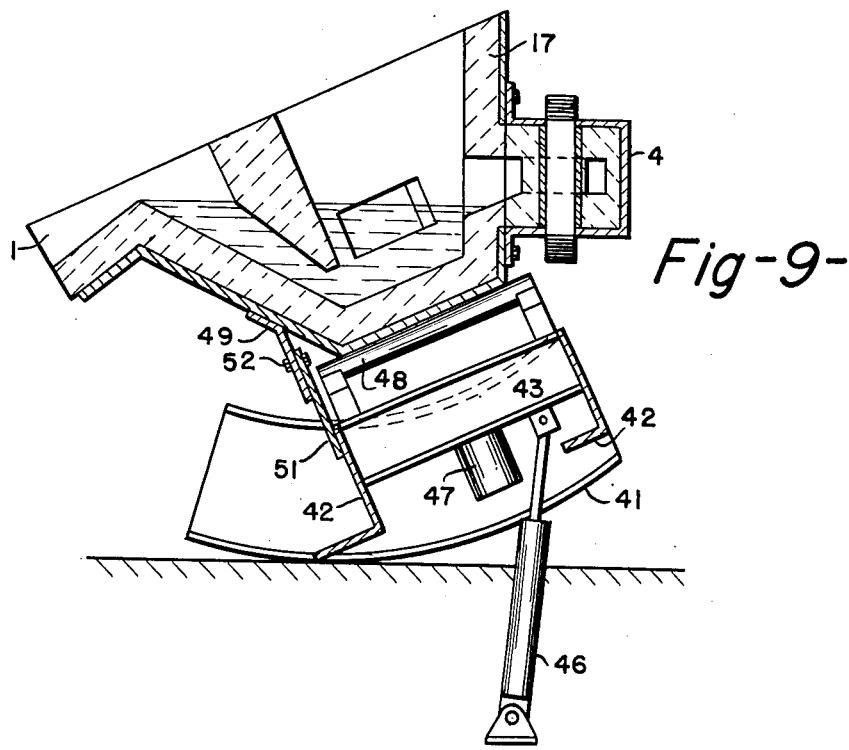
Fig-9-
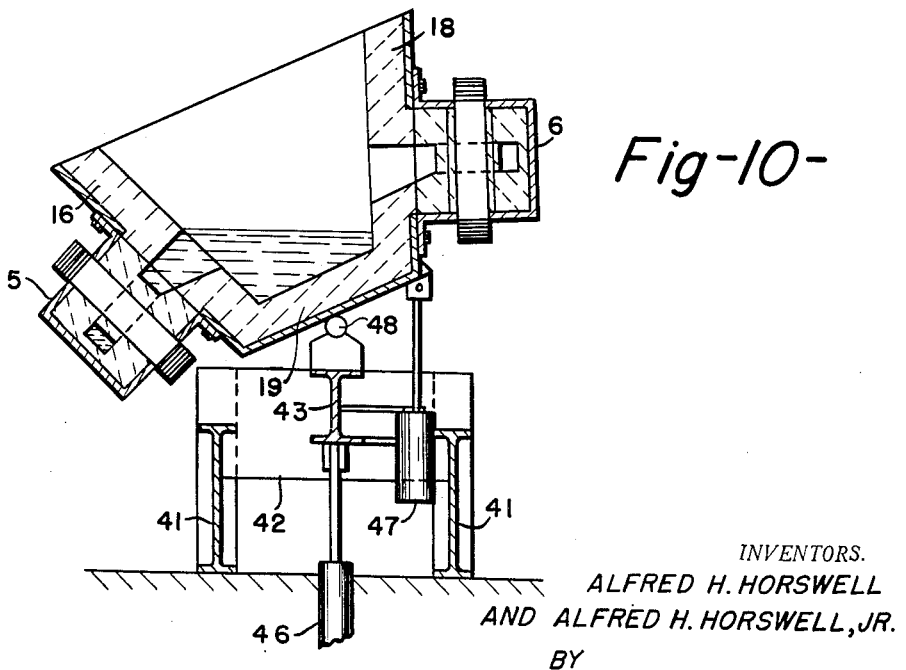
Fig-10-
INVENTORS.
ALFRED H. HORSWELL
AND ALFRED H. HORSWELL, JR.
BY
ATTORNEY March 4, 1952 A. H. HORSWELL ET AL 2,587,727
TILTABLE INDUCTION FURNACE
Filed Sept. 3, 1949 6 Sheets-Sheet 6
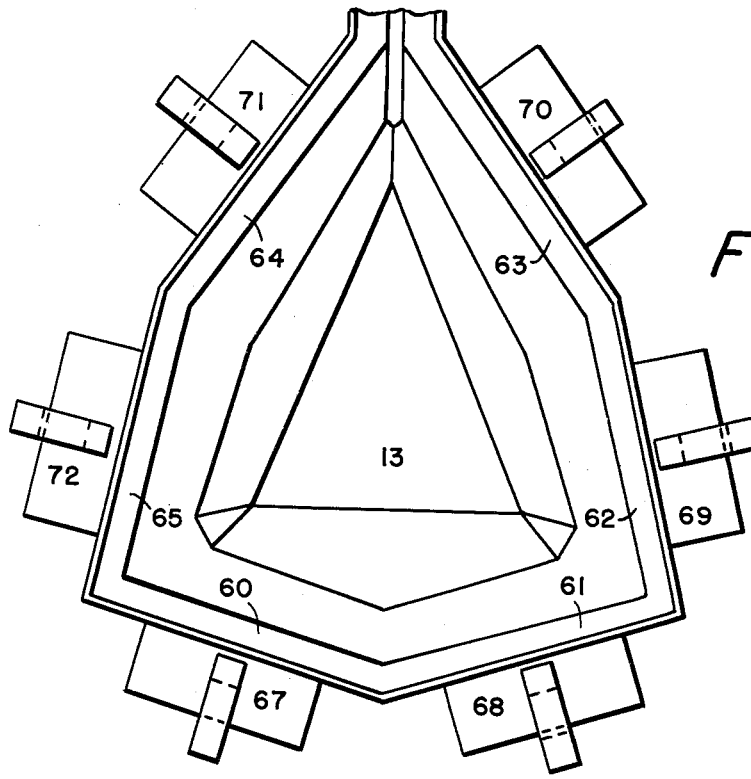
Fig-11-
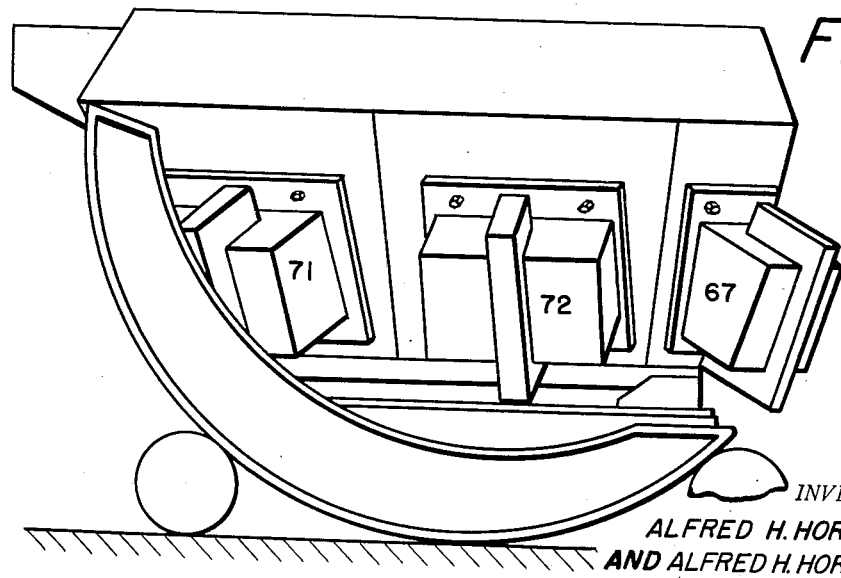
Fig-12-
INVENTORS.
ALFRED H. HORSWELL
AND ALFRED H. HORSWELL, JR.
BY
ATTORNEY Patented Mar. 4, 1952

2,587,727

UNITED STATES PATENT OFFICE 2,587,727

TILTABLE INDUCTION FURNACE

Alfred H. Horswell and Alfred H. Horswell, Jr., Jermyn, Pa., assignors to Ajax Engineering Corporation, Trenton, N. J.

Application September 3, 1949, Serial No. 113,966

7 Claims. (Cl. 13—29)

This invention relates to a tiltable induction furnace and more particularly to a tiltable submerged resistor type induction furnace, which is provided with multiple inductor units.

These multiple inductor unit furnaces are frequently used for melting and particularly metal melting purposes; in this capacity they must comply with many and partly divergent requirements.

It is therefore a primary object of this invention to meet these various aims in a satisfactory manner by the coaction of design and operational features, which will be described as this description proceeds.

Induction furnaces of the open ring and submerged resistor type, which are provided with a plurality and particularly three inductor units and possess a flat bottom are known in several varieties.

Representatives of these induction furnace types are found in U. S. Patent No. 2,079,610, Harris, where a hearth having inclined walls merges with the bottom walls of the melting channels each of the bottom surfaces being a segment of the frustrum of a cone, in U. S. Patent No. 1,313,274, De Barros and in U. S. Patent No. 987,404, Bodenhauser, where three inductor units are located in the walls or next to the inner walls of a triangularly shaped melting chamber.

Moreover, the asymmetrical or one-sided attachment of three inductor units to a tiltable induction furnace, is for instance, disclosed in U. S. Patent No. 1,561,408, Chartier, and their application in several adjacent vertical planes to a cylindrical rotatable furnace chamber is apparent from U. S. Patent No. 1,235,630, Wyatt.

However, in none of the above referred-to multiple inductor unit furnaces is the important problem considered or solved which is involved in the replacement and in the location of these units in a manner that these operations do not interfere with the continuity of the furnace performance.

The provision of replaceable inductor units in these induction furnaces is not novel "per se"; however, with the known constructions of this type the replacement of a defective inductor unit either requires an emptying of the furnace or a tilting of the same with a great load, which disadvantage applies, for instance, to the Summey furnace, U. S. Patent No. 2,102,582; often an excessive tilt is required for the complete drainage of the furnace. The difficulties and drawbacks of these procedures are obvious.

It is an important object of this invention to meet the various requirements of induction furnace operation and particularly that of replacement of the inductor units and of the partial or total emptying of the furnace, while maintaining therein a possible minimum metal load and a minimum of wear of the furnace lining.

It is a particular advantage of this invention to reduce the metal load as compared for instance with drum type furnaces and to hereby enable an easy change of the furnace charges, for instance, metal alloys.

It is a further object of this invention to render the exchange of the inductor units possible without interruption of the furnace operation.

It is another object of the invention to provide for an easy access to the inner walls of the furnace chamber for the purpose of replacement and repair of the hearth lining.

It is a further object of this invention to accelerate and intensify the transfer of the heat created by the inductor units to the bulk of the charge.

It is also an object of the invention to facilitate the tilting of the charged furnace by placing the load into the upper portion thereof.

It is an object of this invention to symmetrically distribute a plurality of inductor units in an efficient coaction with the melting chamber.

A further object of this invention is to greatly facilitate the pouring of the charge by tilting the furnace in a simple manner about a plurality of tilting axes.

It is another object of this invention to secure the pouring of a pure metal and to prevent its contamination with impurities, slags and the like.

It is an important object of the invention to effect the tilting of the furnace with a minimum power requirement and to achieve an easy control of this tilting procedure.

With these and additional objects in view which will become apparent as this description proceeds, the invention comprises in a submerged resistor type induction furnace a downwardly converging melting chamber having a preferably inverted frusto-pyramidal shape and the symmetrical attachment of inclined removable inductor units to the outer faces of the chamber walls; in combination therewith means are provided to tilt the furnace for pouring and emptying purposes around more than one axis.

The downward reduction of the cross-sectional hearth area of an induction furnace towards a flat bottom has already been applied to induction furnaces as apparent from U. S. Patent No. 1,676,545, Gross. Usually furnaces of this type have a circular shape; however, the cross-sectional reduction is negligible in these known furnaces; moreover, the inductor units of the furnaces themselves form the walls of the melting chamber, whereas according to the present invention the chamber walls form the entire extent of the downwardly inclined sides of the frusto-pyramidal metal melting and holding furnace chamber, the inclined inductor units are exchangeably attached to the outer wall faces of this pyramidal chamber.

The method of tilting an induction furnace about more than one axis for pouring as well as for bath circulating purposes is also known.

However, this invention combines the pouring of the furnace about more than one axis with the replaceable attachment of the inductor units to the walls of the downwardly converging melting hearth thereby shifting the weight of the charge into the top portion of the hearth, rendering an easy change of the charge and an easy exchange of these units possible and enabling the emptying of the metal from all inductor units.

With the above-recited objects and purposes in view the invention will now be described more in detail and with reference to the attached drawings illustrating several preferred embodiments thereof.

In the drawings

Fig. 1 is a plan view of the furnace the cover otherwise applied thereto being removed, Fig. 2 is a sectional view on line 2—2 of Fig. 1, Fig. 3 is a sectional view equal to that of Fig. 2, the furnace being tilted for partial drainage and the replacement of the rear inductor unit, Fig. 4 is a sectional view taken on line 4—4 of Fig. 2, Fig. 5 is a sectional view of the furnace taken on line 5—5 of Fig. 1, the furnace being shown in a tilted position to drain one of the lateral inductor units, Fig. 6 is a sectional view similar to that of Fig. 5 the furnace being tilted to drain the other lateral inductor unit, Fig. 7 is a side view of a further embodiment of this furnace, Fig. 8 is a vertical sectional view thereof, Figs. 9 and 10 show in combination with the same vertical sectional view as that of Fig. 8 the furnace in a tilted position for the drainage of the rear inductor and of a lateral inductor unit respectively, Fig. 11 is a plan view of a further modification of the furnace, Fig. 12 is a side view thereof.

Referring to the drawings the induction furnace illustrated therein comprises a metal melting or molten metal holding chamber 13, two lateral inductor units 5, 6 and a rear inductor unit 4, a pouring spout 1 and an understructure tiltably supporting the melting chamber. The chamber 13 is housed by a steel casing 14 provided with a refractory lining 15.

The melting chamber has in accordance with this invention a downwardly converging shape and preferably the shape of an inverted frusto-pyramid which consists of the three downwardly and inwardly inclined side walls 16, 17, 18 and has a flat bottom 19. The furnace is ordinarily provided with a cover, not shown in the drawings.

The pouring spout 1 is located at an edge or corner portion of the chamber which is formed along the line where two walls meet; the edge or corner portion situated oppositely to the rear wall 17 is particularly suited for this purpose. Short flat outside faces 20 are provided at the two other chamber edges whereas at the inner chamber face the side walls 16, 17, 18 meet to form inwardly inclined corners 21.

A baffle 22 protrudes from above into the chamber 13; the baffle forms with the converging portions of walls 16, 18 a pouring outlet 23 which is connected by passage 24 with the bottom portion of the chamber 13.

Three inductor units composed of one rear unit 4 and two lateral units 5, 6 are by means of bolts 40 removably attached to the outer faces of the side wall 16, 17, 18 of the metal holding chamber 13. These inductor units are shown in detail in Patent No. 2,474,443; they consist of a refractory block 25 surrounded by a steel casing 26. The inductor units contain a secondary loop formed of inclined lateral melting channels 29 and a connecting channel 28. The secondary loop is threaded by a primary consisting in the usual manner of a laminated iron core 27 surrounded by a copper coil 50. The melting channels of the inductor units are connected with the metal holding chamber by passages 30 provided in the three walls 16, 17, 18, these passages flaring-out towards the chamber 13.

The furnace is supported on a frame structure 31. A cradle 11, Fig. 2, is located upon this frame structure; this cradle is by means of a hinge pin 2 rotatably mounted on the frame 31 in such a manner that the furnace can be tilted about this pin.

The cradle 11 supports two bearings 32, see Figs. 2, 3; a roller 33 carried by these bearings tiltably supports the furnace, the roller axis extending at an angle of 90° to the axis of hinge pin 2; the furnace is accordingly tiltable about these two horizontal axes represented by pin 2 and roller 33 in two planes, which extend relative to each other at an angle of 90°.

An hydraulic cylinder 3 is provided to effect the tilting of the furnace about pin 2, the front plate 34 and stop plate 35, Fig. 2, being in this case connected by removable bolt 36.

Two clips 8, 37 are fastened to the bottom casing of the furnace and corresponding clips 9, 38 to the frame 31, see Figs. 4, 5, 6. A removable post 7, Fig. 5, connects the clips 8 or 37 to 9 or 38 respectively and removable pins 10 connect the ends of the post with the clips. The pins permit a rotation of post 7; accordingly the clips 8, 37 may freely move in the forked ends of post 7 during the tilting of the furnace, see Figs. 5, 6.

The same cylinder 3, therefore, effects the tilting of the furnace about pin 2, while the stop plates are connected and about roller 33, while the stop plates are unattached. However, the tilting about roller 33 may also be effected by a second hydraulic cylinder; in this case post 7 would not be required.

The operation of the furnace shown in Figs. 1 to 6 will now be described in detail.

Fig. 2 illustrates the normal working position of the furnace and Fig. 3 shows the furnace in a tilted position about hinge pin 2.

In order to pour the metal from the furnace, to empty the same or to replace the inductor unit 4 the furnace is tilted by means of cylinder 3 around hinge pin 2. The position for the drainage of this inductor unit and its replacement is shown in Fig. 3; the furnace still holds in the hearth and other inductor units sufficient metal to provide for a safe operation; the tilting angle is about 15 degrees. At the same time the furnace is prohibited by the plates 34, 35 connected by the removable bolt 36 from tilting in any other direction.

A total drainage of the furnace hearth can be effected by further tilting about hinge pin 2.

Due to the symmetrical arrangement of the three inductor units and of the furnace supporting members torsional moments are greatly reduced, which will prevent premature wear of the furnace parts.

As a consequence of the here disclosed particular shape of the metal holding chamber the main load of the furnace is concentrated in its upper portion; therefore the furnace can be easily tilted by the application of a small power source; moreover, the tilting movement can be more easily controlled. A further important advantage of the furnace results from the frusto-pyramidal shape of the chamber 13 and the comparatively small amount of metal held therein for the purpose to complete the circuit of induction in comparison, for instance, to tiltable furnaces having straight walls or being of the drum type. The reduction of the holding capacity facilitates the changing of the charge; this is of particular importance in the production of alloys. In many plants where induction furnaces are used for this purpose the alloys are often changed; it is obviously easier to effect this change when the amount of metal held in the furnace is comparatively small.

The tilting of the furnace about an axis extending at an angle of 90° to pin 2 for the drainage and replacement of the lateral inductor units is illustrated in Figs. 4, 5, 6 of the drawings.

Fig. 4 shows the furnace in the untilted normal working position. The two lateral inductor units 5, 6 are attached to the side walls 16, 18 of the metal holding chamber 13.

The tilting of the furnace is mainly effected for the drainage of the metal through spout 1 and for the replacement of the inductor units.

In order to replace inductor unit 6, see Fig. 5, a certain amount of metal is first poured from spout 1. The furnace is then returned to an approximate horizontal position and post 7 is attached to clips 8, 9 with pin 10. The bolt 36 is then removed whereupon the furnace is ready for the tilting movement into the position shown in Fig. 5. The angle of the bottom of the furnace when measured from the horizontal and at right angles to the side 18 is about 150° and the electric circuit is fully operative with the other two inductor units 4 and 5.

Fig. 6 shows the furnace in an analogous position to that of Fig. 5 for the removal of the inductor unit 5. The tilting procedure is the same with the only difference that the furnace is tilted in the opposite direction.

The modification of the furnace illustrated by Figs. 7 to 10 is designed on the basis of the above described principles.

The furnace chamber has the shape of an inverted frusto-pyramid composed of three downwardly and inwardly inclined walls 16, 17, 18 and a flat bottom 19. The furnace is poured from outlet 1, which is located in the top portion of the front edge formed by the converging lateral walls 16, 18 and located opposite to wall 17. The furnace is provided with three inductor units 4, 5, 6 which are replaceably attached to the rear wall 17 and side walls 16, 18.

The manner of tilting the furnace about two axes varies somewhat from that shown in Figs. 1-6.

The furnace is mounted on a rocking structure composed of segmental runners 41, which are connected by cross beams 42, Fig. 8. Between these beams and attached thereto is a cross piece 43. The tilting of the furnace on these runners for the purpose of emptying the rear inductor unit 4 or for replacing the same is effected by a rocking cylinder 46, which is connected to the cross piece 43.

In order to tilt the furnace for the drainage or replacement of the lateral inductor units 5, 6, the furnace is rotatably supported on roller 48, which is carried on cross piece 43.

Side cylinder 47 connected to a bottom edge of the furnace chamber 13 effects this tilting around roller 48.

The front plate 49 is attached to chamber 13 and the front plate 51 to cross piece 43, which plates may be connected by bolt 52 to secure the furnace during its tilting movements.

The furnace shown in Figs. 11 and 12 in a top and a side view varies from the above-described embodiment of the invention insofar as the metal holding chamber 13 has the shape of a 6-angular inverted frusto-pyramid and is composed of 6 side walls 60—65.

Six inductor units 67—72 are replaceably attached to the six walls of the furnace in the previously described manner.

This furnace is also tiltable about two axes.

The invention has been described with reference to several preferred embodiments but it will be understood that many further variations and modifications thereof may be resorted to without departure from the scope of the invention as defined in the following claims.

We claim:

1. A submerged resistor type induction furnace comprising a metal melting and holding chamber having the shape of an inverted frusto-pyramid and being composed of a top, a bottom of a smaller size than said top and inclined side walls converging from the top towards said bottom, secondary melting loops and inductor units threading said loops attached to the outer faces of said side walls said melting loops entering the furnace chamber through said side walls exclusively and means to tilt the furnace about more than one horizontal axis.

2. A submerged resistor type induction furnace comprising a metal melting and holding chamber having the shape of an inverted frusto-pyramid and being composed of a top forming the base of the pyramid, a size-reduced bottom forming the apex thereof and inclined side walls convergingly connecting the top and the bottom, secondary melting loops and inductor units threading said loops attached in a symmetrical distribution to the outer faces of each side wall, said melting loops entering the furnace chamber through said side walls exclusively and means to tilt the furnace about more than one horizontal axis.

3. In a submerged resistor type induction furnace, a hearth having the shape of an inverted triangular frusto-pyramid and being composed of a top, of a flat bottom having a smaller size than said top and of inclined straight side walls converging from the top towards the bottom and forming therebetween edge portions, secondary melting loops and inductor units threading said loops attached to the outer faces of said straight inclined walls, said melting loops entering the lower portion of said furnace chamber through said walls exclusively, a pouring spout attached to the top of an edge portion and means to tilt the furnace about more than one horizontal axis.

4. In a submerged resistor type induction furnace, a hearth having the shape of an inverted triangular frusto-pyramid and being composed of a top, of a flat bottom having a smaller size than said top and of inclined straight side walls converging from the top towards the bottom and forming therebetween edge portions, three secondary melting loops and corresponding inductor units threading said loops each attached to an outer face of a straight inclined wall, means to replaceably detach and exchange an inductor unit while the others are in operation, said melting loops entering the lower portion of said furnace chamber through said walls exclusively, a pouring spout attached to the top of an edge portion and means to tilt the furnace about more than one horizontal axis.

5. In a submerged resistor type induction furnace, a hearth having the shape of an inverted triangular frusto-pyramid and being composed of a top, of a bottom having a smaller size than said top and inclined straight side walls converging from the top towards the bottom and enclosing edge portions therebetween, secondary melting loops and inductor units threading said loops attached to the outer faces of said straight inclined walls, said melting loops entering said furnace chamber through said walls exclusively, means to displaceably attach said inductor units to the outside faces of said straight walls, a pouring spout attached to the top of an edge portion, a frame structure to support the furnace, a cradle located upon this frame structure, a hinge pin rotatably connecting said cradle and said frame structure, one roller attached to the outside bottom face of said hearth, bearings located upon said cradle to rotatably support said roller and means to tilt the furnace about said hinge pin and said roller.

6. In a submerged resistor type induction furnace according to claim 3, the inductor units being attached at a substantially equal level to the outside of the furnace walls.

7. In a submerged resistor type induction furnace according to claim 3, means for detaching and exchanging one of said inductor units, while the other are in operation and a pouring spout in the top portion of said hearth.

ALFRED H. HORSWELL.
ALFRED H. HORSWELL, Jr.

REFERENCES CITED

The following references are of record in the file of this patent:

UNITED STATES PATENTS

| Number | Name | Date |
| --- | --- | --- |
| 259,282 | Bavier | June 13, 1882 |
| 761,920 | Schneider | June 7, 1904 |
| 763,330 | Schneider | June 21, 1904 |
| 1,411,158 | Bradley | Mar. 28, 1922 |
| 1,444,584 | Clamer et al. | Feb. 6, 1923 |
| 1,589,266 | Summey | June 15, 1926 |
| 1,608,801 | Masel et al. | Nov. 30, 1926 |
| 1,628,375 | Unger | May 10, 1927 |
| 1,676,545 | Gross | July 10, 1928 |
| 1,884,637 | Feehan | Oct. 25, 1932 |
| 2,214,123 | Delpech | Sept. 10, 1940 |
| 2,268,918 | Allan et al. | Jan. 6, 1942 |
| 2,474,443 | Tama et al. | June 28, 1949 |
| 2,481,699 | Stroman | Sept. 13, 1949 |

FOREIGN PATENTS

| Number | Country | Date |
| --- | --- | --- |
| 892,728 | France | Jan. 13, 1944 |